Patented Nov. 14, 1933

1,935,577

UNITED STATES PATENT OFFICE 1,935,577

VINYL RESIN

Ernest W. Reid, Pittsburgh, Pa., assignor to Carbide and Carbon Chemicals Corporation, a corporation of New York No Drawing. Application May 17, 1928
Serial No. 278,641

8 Claims. (Cl. 260—2)

The invention relates to a group of artificial resin-like substances useful in the making of lacquers, plastics, and other compositions.

It has heretofore been proposed to polymerize vinyl acetate (or the chlor-acetate) by heat or ul raviolet radiation, a catalyst being preferably used to promote the polymerization. Among the catalysts which have been recommended are many highly oxygenated substances, such as benzoyl peroxide; peroxides of hydrogen and metals; ozonides; persalts, such as persulphates and percarbonates; and the corresponding peracids. The product of the polymerization has been described as. useful for lacquers and plastics. It has also been proposed to polymerize vinyl chloride to produce resinous produc's.

Notwithstanding such disclosures the polymerization products of vinyl acetate have not, as far as I am aware, been used commercially for the purposes mentioned above. The reason for this appears to be that these products, when used in lacquers, give a coating which, while it has good adhesive properties, is too soft, too low melting and too easily soluble in common solvents. As a result of its properties the film is readily scratched and abraded, and is easily damaged by contact with preparations containing alcohols.

The polymerization products of vinyl chloride have also failed to find any commercial use in liquid coating compositions or plastics. My experiments have shown that the products made from the chloride are somewhat harder, higher melting, and less soluble than those from the acetate but that they are brittle and deficient in cohesive and adhesive properties. Moreover, films prepared from them tend to darken rapidly and to become opaque, especially when exposed to sunlight. I have also polymerized vinyl benzene, or styrol, (C6H5.CH:CH2) and find that the resinous products obtained from it are somewhat similar to that from vinyl chloride, but still less adhesive.

I have attempted to overcome the objections referred to by mixing together vinyl polymers of the hard and high melting type and of the softer and more adhesive type, but without success. I have, however, discovered a quite unsuspected phenomenon, viz. that when vinyl compounds which form polymers of both of these types are polymerized while in mutual contact, products are obtained which differ profoundly from those which can be made by polymerizing the same compounds separately or by mixing the products obtained when these vinyl compounds are polymerized separately. The products of this conjoint polymerization (by which is meant polymerization of a plurality of compounds while in mutual contact) are tough and strong and are much better adapted to the purposes of the lacquer and plastic industries wi h respect to insolubility, adhesiveness, and stability than are the polymerization products prepared from the single vinyl compounds. This gives rise to the hypothesis that the conjoint polymerizations.result in chemical compounds of a new type, but the validity of the hypothesis has not been proved experimentally because of the practical difficulties involved.

Plasticization of resins is ordinarily accomplished by incorporating appropriate high-boiling solvents with the resins but, as stated above, a brittle and non-adhesive vinyl polymer like polymerized vinyl chloride cannot be satisfactorily plasticized by the mere physical addi'ion of a softer and more adhesive vinyl resin like polymerized vinyl acetate. By the conjoint polymerization of a vinyl compound tending to give a brittle non-adhesive product with a compound tending to give a softer and more adhesive product, an inherently and internally permanently plas'icized resin is formed, presumably by a chemical interaction during the course of the polymerization.

The methods which have been proposed for the polymerization of single vinyl compounds are in general suitable for conjoint polymerizations. Heat, ultraviolet radiation and catalysts may be advantageously used singly or jointly to expedite polymeriza'ion. A mutual solvent for the compounds involved usually facilitates the process, but in some cases a solvent may be dispensed with. When the resin produced is to be used as or in a plastic composition, any nonsolidifiable solvent present is usually removed before the final shaping of the plastic. All or part of any solvent used in the polymerization may likewise be removed from the product when the latter is to be used in a lacquer or the like, but it is often possible and desirable to use a solvent in the polymerization which is also a useful lacquer constituent and hence need not be removed completely or at all. Thus acetone may be used in the polymerization but if used it should usually be expelled, at least in part, from the product and replaced by a solvent better adapted as a lacquer ingredient. On the other hand toluene and like hydrocarbon liquids which are standard lacquer ingredients are also useful solvents for the polymerization.

The product of the conjoint polymerization of a vinyl compound tending to yield a brittle, hard, non-adhesive polymer with a vinyl compound of the type which tends to give a softer and more adhesive polymer may be combined with a great variety of substances to produce coating compositions and other preparations. In this connection the new resins resemble known natural and artificial resins and it is only necessary to refer to the diversity of solvents, pigments, dyes, plasticizers, and other auxiliary agents which have been proposed for use in lacquers and plastics. An especially interesting class of compositions are those which contain the conjoint polymerization products described herein together with cellulose derivatives, such as cellulose nitrates and acetates. Plasticizers, such as camphor, tricresyl phosphate, dibutyl phthalate, oxidized oils and the like may be incorporated as in prior compositions used in the art. Other resins, either natural or artificial may of course be combined with the resins described herein.

It will be apparent from what has been said that the invention contemplates a number of modifications of the resin itself and of the auxiliary substances used in connection therewith. A specific example will now be given to illustrate the invention.

The mixture of polymerizable substances may be dissolved in an equal weight of solvent, such as acetone or toluene, and processed in accordance with the methods of the prior art until polymerization has reached the desired stage. The solvent may then be distilled off or the entire reaction mixture may be blended with the other ingredients of the final mixture. The polymerizable substances may comprise vinyl acetate and vinyl chloride in a wide variety of proportions, for example from 10 to 90 parts of the acetate with 90 to 10 parts of the chloride. Approximately equal proportions of chloride and acetate give excellent resins for many purposes. A very good resin has been prepared from a mixture containing vinyl acetate 25 parts, vinyl chloride 22 parts, acetaldehyde 3 parts and solvent 50 parts.

In view of the fact that the invention provides an entirely new class of resins and processes of making them, it will be understood that the foregoing description is to be considered not as limitative but merely illustrative, and that modifications of the invention are possible and are included within its scope as defined by the appended claims.—

I claim:

1. Process of making a tough and strong artificial resin which comprises conjointly polymerizing vinyl acetate and vinyl chloride.

2. A tough and strong artificial resin such as may be made by the process which comprises conjointly polymerizing vinyl acetate and vinyl chloride.

3. A tough and strong artificial resin containing a substantial proportion of those substances which are formed when vinyl chloride is conjointly polymerized with vinyl acetate.

4. Process of making an artificial resin which comprises conjointly polymerizing vinyl chloride with a vinyl ester of a lower fatty acid.

5. An artificial resin containing a substantial proportion of those substances which are formed when vinyl chloride is conjointly polymerized with a vinyl ester of a lower fatty acid.

6. A tough and strong artificial resin containing a substantial proportion of those substances which are formed when about 90 parts of vinyl chloride are conjointly polymerized with about 10 parts of vinyl acetate.

7. A tough and strong artificial resin containing a substantial proportion of those substances which are formed when from about 90 to about 50 parts of vinyl chloride are conjointly polymerized with from about 10 to about 50 parts of vinyl acetate.

8. A tough and strong artificial resin containing a substantial proportion of those substances which are formed when from about 90 to about 10 parts of vinyl chloride are conjointly polymerized with from about 10 to about 90 parts of vinyl acetate.

ERNEST W. REID.